United States Patent
Ito et al.

(10) Patent No.: US 11,943,566 B2
(45) Date of Patent: Mar. 26, 2024

(54) COMMUNICATION SYSTEM

(71) Applicant: HONDA MOTOR CO., LTD., Tokyo (JP)

(72) Inventors: Motoki Ito, Tokyo (JP); Ryusuke Tamanaha, Tokyo (JP)

(73) Assignee: HONDA MOTOR CO., LTD., Tokyo (JP)

( * ) Notice: Subject to any disclaimer, the term of this patent is extended or adjusted under 35 U.S.C. 154(b) by 0 days.

(21) Appl. No.: 17/972,924

(22) Filed: Oct. 25, 2022

(65) Prior Publication Data

US 2023/0171381 A1 Jun. 1, 2023

(30) Foreign Application Priority Data

Nov. 30, 2021 (JP) ................................ 2021-194420

(51) Int. Cl.
| | |
|---|---|
| *H04N 7/18* | (2006.01) |
| *G06T 7/70* | (2017.01) |
| *H04N 5/77* | (2006.01) |
| *H04N 23/80* | (2023.01) |

(52) U.S. Cl.
CPC .............. *H04N 7/181* (2013.01); *G06T 7/70* (2017.01); *H04N 5/77* (2013.01); *H04N 23/80* (2023.01)

(58) Field of Classification Search
CPC .......... H04N 7/181; H04N 23/80; H04N 5/77; G06T 7/70
See application file for complete search history.

(56) References Cited

U.S. PATENT DOCUMENTS

| | | | | |
|---|---|---|---|---|
| 10,657,343 | B1* | 5/2020 | Studnicka | G06Q 20/3276 |
| 2007/0022447 | A1* | 1/2007 | Arseneau | H04H 60/15 |
| | | | | 725/38 |
| 2007/0120873 | A1* | 5/2007 | Relan | G11B 27/034 |
| | | | | 348/584 |
| 2013/0304276 | A1* | 11/2013 | Flies | G07C 5/085 |
| | | | | 701/1 |
| 2014/0150042 | A1* | 5/2014 | Pacor | H04N 21/63 |
| | | | | 725/116 |

(Continued)

FOREIGN PATENT DOCUMENTS

JP 2003-087615 3/2003

*Primary Examiner* — Daniel T Tekle
(74) *Attorney, Agent, or Firm* — Rankin, Hill & Clark LLP

(57) ABSTRACT

Provided is a communication system that includes: a first imaging device; a communication unit configured to execute a first communication with a mobile communication terminal and a second communication with a communication device other than the mobile communication terminal to execute relay communication relaying the communication between the mobile communication terminal and the communication device; a communication control unit configured to receive, from the mobile communication terminal via the first communication, data of a second captured image that is captured by a second imaging device provided in the mobile communication terminal having the first communication established for the relay communication; and an image processing unit configured to execute prescribed image processing based on the data of a first captured image that is captured by the first imaging device and the data of the second captured image.

8 Claims, 4 Drawing Sheets

(56) References Cited

U.S. PATENT DOCUMENTS

| | | | | |
|---|---|---|---|---|
| 2015/0168144 A1* | 6/2015 | Barton | ............... | G01C 11/02 |
| | | | | 348/144 |
| 2015/0363986 A1* | 12/2015 | Hoyos | ............... | G07C 9/00571 |
| | | | | 340/5.61 |
| 2018/0176501 A1* | 6/2018 | Buddhavaram | ...... | B01D 17/045 |
| 2019/0260961 A1* | 6/2019 | Saito | ............... | G06T 7/50 |
| 2019/0303463 A1* | 10/2019 | Catalano | ............... | G06F 16/22 |
| 2020/0184226 A1* | 6/2020 | Zhu | ............... | G06V 20/54 |
| 2020/0204848 A1* | 6/2020 | Johnson | ............... | H04N 7/188 |
| 2020/0349666 A1* | 11/2020 | Hodge | ............... | G08G 1/017 |
| 2021/0097830 A1* | 4/2021 | England | ............... | G08B 13/19695 |
| 2022/0058400 A1* | 2/2022 | Bianconcini | ............... | G06T 7/20 |
| 2023/0036188 A1* | 2/2023 | Schmidt | ............... | G07C 9/00896 |
| 2023/0054224 A1* | 2/2023 | Ohishi | ............... | G08G 1/0112 |
| 2023/0126369 A1* | 4/2023 | Duraisamy | ......... | G06F 21/6218 |
| | | | | 726/6 |
| 2023/0171117 A1* | 6/2023 | Ito | ............... | H04L 12/1428 |
| | | | | 455/406 |
| 2023/0171381 A1* | 6/2023 | Ito | ............... | H04N 23/80 |
| | | | | 348/148 |

\* cited by examiner

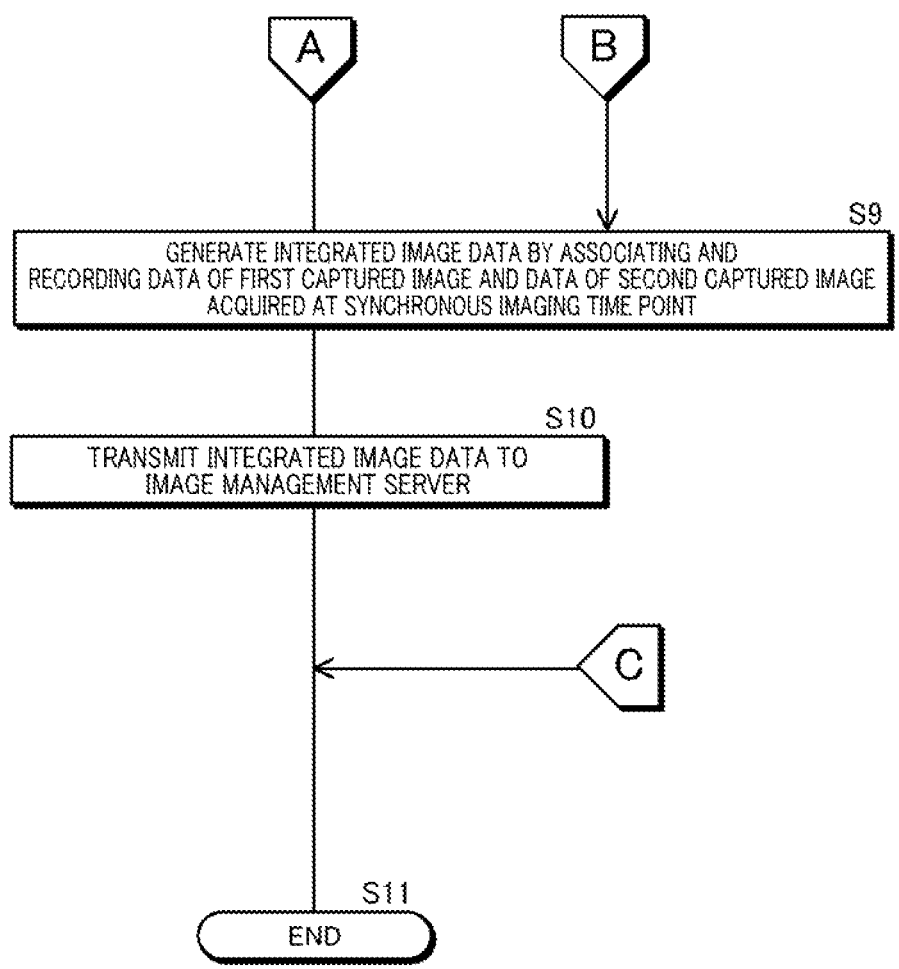

COMMUNICATION SYSTEM

INCORPORATION BY REFERENCE

The present application claims priority under 35 U.S.C. § 119 to Japanese Patent Application No. 2021-194420 filed on Nov. 30, 2021. The content of the application is incorporated herein by reference in its entirety.

BACKGROUND OF THE INVENTION

Field of the Invention

The present invention relates to a communication system.

Description of the Related Art

Conventionally, there has been proposed a system in which a function of communicating with an image collection device outside of a mobile body is provided in a dashboard camera recorder loaded on a vehicle, and captured images that are captured by the dashboard camera recorder are transmitted to the image collection device (for example, see Japanese Patent Laid-Open No. 2003-87615). With this system, the captured images are used for fixed point observation, searching for a lost child, checking the situation at a fire site, and the like in addition to detecting an accident.

In a case of the conventional technology described above, images that can be acquired are limited to images captured by a fixed-angle camera provided in the dashboard camera recorder. Therefore, there is a disadvantage that it is difficult to collect the captured images over a wide range. While use of an omnidirectional camera may be considered, it may cause disadvantages such as increase in the device cost and complication in the image processing.

The present invention has been made in view of the aforementioned circumstances, and it is an object thereof to provide a communication system capable of acquiring captured images of the surroundings in various angles by a simple configuration with low cost.

SUMMARY OF THE INVENTION

As an aspect for achieving the object, there is a communication system including: a first imaging device; a communication unit configured to execute a first communication with a mobile communication terminal and a second communication with a communication device other than the mobile communication terminal to execute relay communication relaying the communication between the mobile communication terminal and the communication device; a communication control unit configured to receive, from the mobile communication terminal via the first communication, data of a second captured image that is captured by a second imaging device provided in the mobile communication terminal having the first communication established for the relay communication; and an image processing unit configured to execute prescribed image processing based on the data of a first captured image that is captured by the first imaging device and the data of the second captured image.

The communication system may include a synchronous imaging time point determination unit configured to determine a synchronous imaging time point for synchronizing imaging performed by the first imaging device and the second imaging device, in which the communication control unit: transmits, via the first communication, synchronous imaging time point information indicating the synchronous imaging time point to the mobile communication terminal having the first communication established for the relay communication; and receives, via the first communication, the data of the second captured image that is captured by the second imaging device at the synchronous imaging time point according to the synchronous imaging time point information, and the image processing unit executes the prescribed image processing based on the data of the first captured image that is captured by the first imaging device at the synchronous imaging time point and the data of the second captured image that is captured by the second imaging device at the synchronous imaging time point.

In the communication system, as the prescribed image processing, the image processing unit may execute processing of generating integrated image data containing the data of the first captured image and the data of the second captured image in an associated manner.

In the communication system, the communication control unit may transmit the integrated image data to the communication device via the second communication.

The communication system may be used in a mobile body and may include a mobile communication terminal position recognition unit configured to recognize whether or not the mobile communication terminal is located at a prescribed position of the mobile body, in which the communication control unit receives the data of the second captured image via the first communication, when the mobile communication terminal position recognition unit recognizes that the mobile communication terminal is located at the prescribed position.

In the communication system, the mobile communication terminal position recognition unit may set the prescribed position in accordance with the number of the mobile communication terminals having the first communication established for the relay communication.

In the communication system, the mobile communication terminal position recognition unit may recognize a posture of the mobile communication terminal upon recognizing that the mobile communication terminal is located at the prescribed position of the mobile body, and the communication control unit may receive the data of the second captured image via the first communication, when the mobile communication terminal position recognition unit recognizes that the mobile communication terminal is located at the prescribed position in a prescribed posture.

The communication system may include a mobile communication terminal performance recognition unit configured to recognize a performance of the mobile communication terminal, in which the communication control unit receives the data of the second captured image from the mobile communication terminal via the first communication, when the mobile communication terminal performance recognition unit recognizes that the performance of the mobile communication terminal having the first communication established for the relay communication is a prescribed performance.

In the communication system, the communication unit may execute the relay communication for a plurality of the mobile communication terminals via the first communication established with the plurality of mobile communication terminals, and the communication control unit may receive the data of the second captured images that are captured by the second imaging devices provided in the plurality of mobile communication terminals having the first communication established for the relay communication.

The communication system may be configured with a camera or a dashboard camera recorder.

According to the communication system described above, it is possible to acquire the captured images of the surroundings in various angles by a simple configuration with low cost.

BRIEF DESCRIPTION OF THE DRAWINGS

FIG. 4 is a second flowchart of the captured image providing processing.

DETAILED DESCRIPTION OF THE PREFERRED EMBODIMENTS

Figure 1:
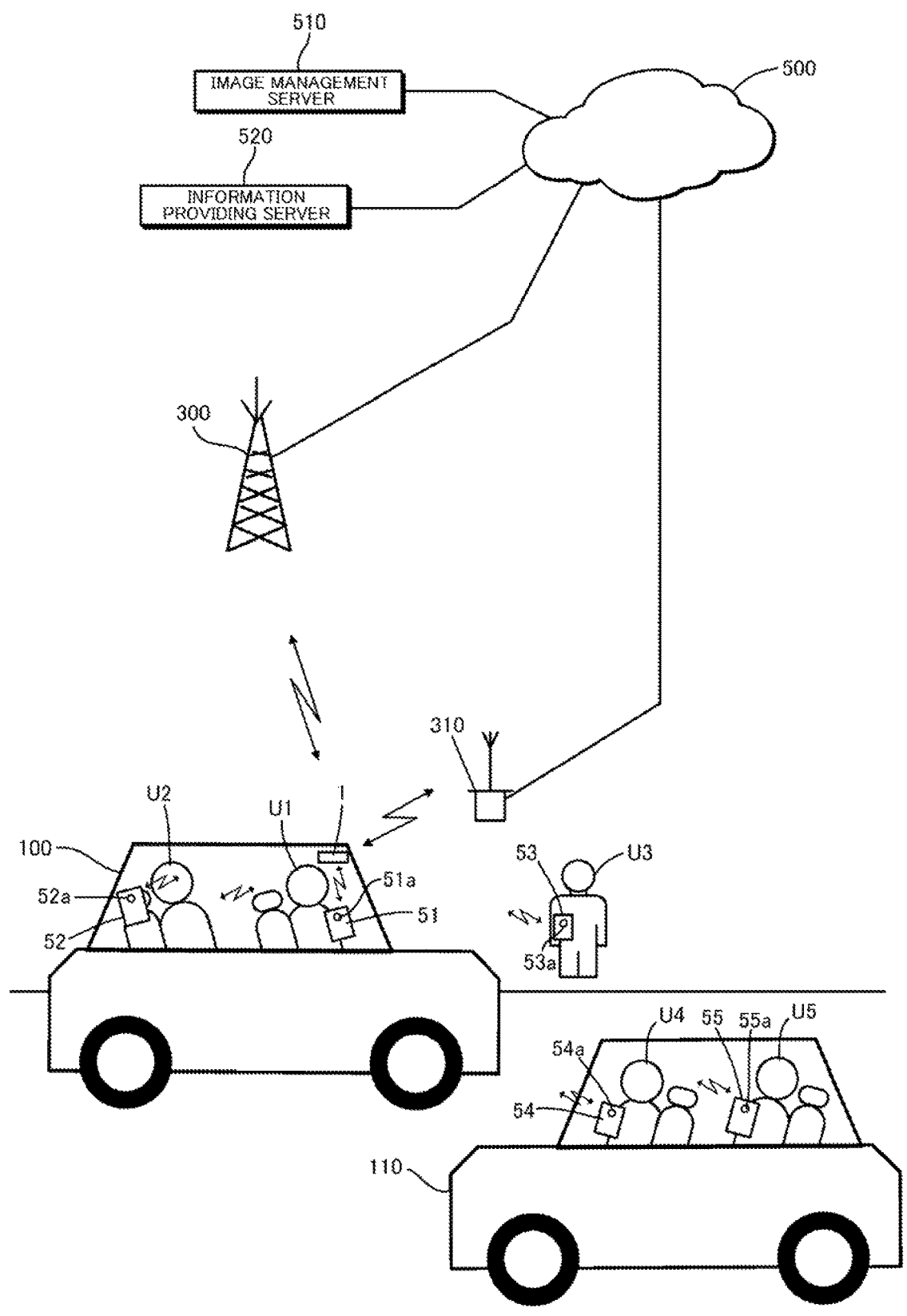
FIG. 1 is an explanatory diagram of a use mode of a dashboard camera recorder.

1. Use Mode of Dashboard Camera Recorder

By referring to FIG. 1, a use mode of a dashboard camera recorder 1 as an example of a configuration of a communication system of the present disclosure will be described. The dashboard camera recorder 1 is used by being mounted to a vehicle 100, and has a function of capturing images of the surroundings of the vehicle 100 and inside the vehicle 100 by a camera. The vehicle 100 corresponds to a mobile body of the present disclosure.

The dashboard camera recorder 1 has a function of performing cellular communication and Wi-Fi (registered trademark) communication. The dashboard camera recorder 1 performs communication with an external communication device (corresponds to a communication device of the present disclosure) via a wide area network 500 by performing cellular communication with a base station 300 of each cell or by performing Wi-Fi communication with a router 310 placed at a Wi-Fi spot near a road. In FIG. 1, an image management server 510 and an information providing server 520 are illustrated as the external communication devices.

Furthermore, the dashboard camera recorder 1 has a function of a Wi-Fi router that establishes Wi-Fi communication with mobile communication terminals 51, 52 that are used by users U1, U2 in the vehicle 100 and implements an in-vehicle Wi-Fi network environment. The mobile communication terminals 51 and 52 are smartphones, mobile phones, tablet terminals, mobile game machines, and the like having a Wi-Fi communication function. Cameras 51*a* and 52*a* are provided in the mobile communication terminals 51 and 52, respectively.

The dashboard camera recorder 1 functions as the Wi-Fi router to enable communication between the mobile communication terminals 51, 52 and the external communication devices such as the image management server 510 and the information providing server 520 via the in-vehicle Wi-Fi network and the wide area network 500. The users U1 and U2 can acquire information by having communication with the information providing server 520, for example, by using the in-vehicle Wi-Fi network environment provided by the dashboard camera recorder 1, even when the mobile communication terminals 51 and 52 do not have the cellular communication function.

Moreover, by using the in-vehicle Wi-Fi network environment of the dashboard camera recorder 1, it is also possible to communicate with external mobile communication terminals 53, 54, and 55 near the vehicle 100. FIG. 1 illustrates a state where wireless communication via the in-vehicle Wi-Fi is established between the dashboard camera recorder 1 and the mobile communication terminal 53 used by a user U3 standing on a sidewalk and the mobile communication terminals 54, 55 used by users U4, U5 riding in an oncoming vehicle 110. Cameras 53*a* to 55*a* are provided in the mobile communication terminals 53 to 55, respectively.

Furthermore, the dashboard camera recorder 1 transmits the captured image that is captured by the camera to the image management server 510 via the wide area network 500. The image management server 510 uses the captured image received from the dashboard camera recorder 1 to perform processing such as analysis of an accident, fixed point observation, inspection of road equipment, and the like.

Note here that wireless communication between the dashboard camera recorder 1 and the mobile communication terminals 51 to 55 corresponds to a first communication of the present disclosure, and wireless communication between the dashboard camera recorder 1 and the external communication devices such as the image management server 510 and the information providing server 520 corresponds to a second communication of the present disclosure. Relay communication relaying the communication between the mobile communication terminals 51 to 55 and the external communication devices is executed by the first communication and the second communication. The cameras 51*a* to 55*a* provided in the mobile communication terminals 51 to 55, respectively, correspond to a second imaging device of the present disclosure.

2. Configuration of Dashboard Camera Recorder

By referring to FIG. 2, the configuration of the dashboard camera recorder 1 will be described. The dashboard camera recorder 1 includes a processor 10, a memory 20, a NAD (Network Access Device) 30, an antenna 31, a front camera 32, a rear camera 33, an in-vehicle camera 34, a GNSS (Global Navigation Satellite System) sensor 35, an acceleration sensor 36, a switch 37, and a display 38. The front camera 32, the rear camera 33, and the in-vehicle camera 34 correspond to a first imaging device of the present disclosure.

The NAD 30 is a chip in which a cellular communication module and a Wi-Fi communication module are integrated. The antenna 31 is a dual-use antenna corresponding to both cellular communication and Wi-Fi communication. The NAD 30 and the antenna 31 form a communication unit of the present disclosure.

The front camera 32 captures an image of the surroundings of a front view of the vehicle 100 and outputs the captured image to the processor 10. The rear camera 33 captures an image of the surroundings of a rear view of the vehicle 100 and outputs the captured image to the processor 10. The in-vehicle camera 34 captures an image of the inside of the vehicle 100 and outputs the captured image to the processor. Note that it is also possible to employ a configuration that includes not all of the front camera 32, the rear camera 33, and the in-vehicle camera 34 but only the front camera 32, for example.

The GNSS sensor 35 receives a radio wave from a positioning satellite to detect the current position (latitude, longitude) of the dashboard camera recorder 1, and outputs a position detection signal to the processor 10. The acceleration sensor 36 detects the acceleration generated in the dashboard camera recorder 1, and outputs an acceleration detection signal to the processor 10. The acceleration sensor 36 detects the acceleration in three orthogonal axis directions, for example. The switch 37 outputs operation signals corresponding to operations of the users U1 and U2 to the processor 10. The display 38 displays an operation state and the like of the dashboard camera recorder 1 in accordance with control input from the processor 10.

The processor 10 functions as an imaging control unit 11, a communication control unit 12, an image processing unit 14, a synchronous imaging time point determination unit 15, a mobile communication terminal position recognition unit 17, a timer unit 18, and a speed recognition unit 19 by reading and executing a control program 21 for the dashboard camera recorder 1 saved in the memory 20.

The imaging control unit 11 captures an image by at least one of the front camera 32, the rear camera 33, and the in-vehicle camera 34 at a prescribed imaging timing, and saves data of a captured image (a first captured image) in a captured image area 22 of the memory 20. As the imaging timing, timings of (1) to (3) as follows are set, for example.

(1) When Vehicle 100 Encounters Accident

The imaging control unit 11 recognizes that the vehicle 100 has encountered an accident by detecting the acceleration in a level of a prescribed threshold or more by the acceleration sensor 36. It is also possible to recognize an accident of the vehicle 100 based on an impact detection signal acquired by an impact sensor provided for an airbag or the like mounted to the vehicle 100.

(2) When Vehicle 100 Travels Through Fixed Point

The imaging control unit 11 recognizes that the vehicle 100 is traveling through a fixed point set in advance from the current position of the dashboard camera recorder 1 detected by the GNSS sensor 35. As the fixed point, for example, a point where a traffic jam is likely to occur, a point where road equipment (road sign, utility pole, or the like) as the target of maintenance is located, a sightseeing spot, or the like may be set.

(3) When Vehicle 100 Travels Through Image Capturing Request Point

The imaging control unit 11 recognizes the image capturing request point by receiving information of the image capturing request point transmitted from the image management server 510, and recognizes that the vehicle 100 is traveling through the image capturing request point from the current position of the dashboard camera recorder 1 detected by the GNSS sensor 35. As the image capturing request point, for example, an accident site of another vehicle, a fire site, a site where a child is lost, or the like is set.

The communication control unit 12 performs control of communication established with the external communication device via the in-vehicle Wi-Fi communication and the wide area network 500 by the NAD 30. The communication control unit 12 packetizes data that is a combination of information data of the in-vehicle Wi-Fi and data of the captured image, and performs communication with the external communication device via the wide area network 500 by packet communication. With this processing, the overhead of control data added to the information data of the captured image and the like transmitted by packet is shrunk and the communication volume is reduced, so that it is possible to reduce the communication cost borne by the users U1 and U2.

The communication control unit 12 receives data of images (second captured images) captured by the mobile communication terminals 51 and 52 from the mobile communication terminals 51 and 52 by the first communication. The processing performed by the communication control unit 12 for acquiring the data of the second captured images will be described later. The image processing unit 14 generates integrated image data in which the data of the images (first captured images) captured by the front camera 32, the rear camera 33, and the in-vehicle camera 34 and the data of the second captured images received by the communication control unit 12 are associated and recorded. The processing of generating the integrated image data performed by the image processing unit 14 corresponds to prescribed image processing of the present disclosure.

The synchronous imaging time point determination unit 15 determines the synchronous imaging time point for executing imaging by synchronizing the imaging time point of the front camera 32, the rear camera 33, and the in-vehicle camera 34 of the dashboard camera recorder 1 with the imaging time point of the cameras 51a and 52a of the mobile communication terminals 51 and 52. The communication control unit 12 transmits the integrated image data generated by the image processing unit 14 to the image management server 510 via the wide area network 500 by the NAD 30.

The mobile communication terminal position recognition unit 17 determines whether or not the mobile communication terminals 51 and 52 used inside the vehicle are located at prescribed positions from an image of the inside of the vehicle 100 captured by the in-vehicle camera 34. The prescribed position may be a mount position of the holder of the mobile communication terminal (the neck part of a headrest of a seat, or the like), for example. FIG. 1 illustrates a state where the mobile communication terminal 52 is located at the prescribed position.

The timer unit 18 performs processing for counting the current date and time. The imaging control unit 11 saves the data of the first captured images, which is acquired by adding information of the date and time that is the imaging timing counted by the timer unit 18 to the captured images that are captured by the front camera 32, the rear camera 33, and the in-vehicle camera 34, in the captured image area 22 of the memory 20. The speed recognition unit 19 recognizes the traveling speed (moving speed) of the vehicle 100 by receiving a speed detection signal Vcar from a car speed sensor provided in the vehicle 100. The dashboard camera recorder 1 receives the speed detection signal Vcar by performing wired or wireless communication with an ECU (Electronic Control Unit) that is provided in the vehicle 100. The speed recognition unit 19 may recognize the traveling speed (moving speed) of the vehicle 100 by performing prescribed image processing on the captured image.

3. Captured Image Providing Processing

According to the flowcharts illustrated in FIG. 3 and FIG. 4, captured image providing processing executed by the dashboard camera recorder 1 will be described.

Figure 3:
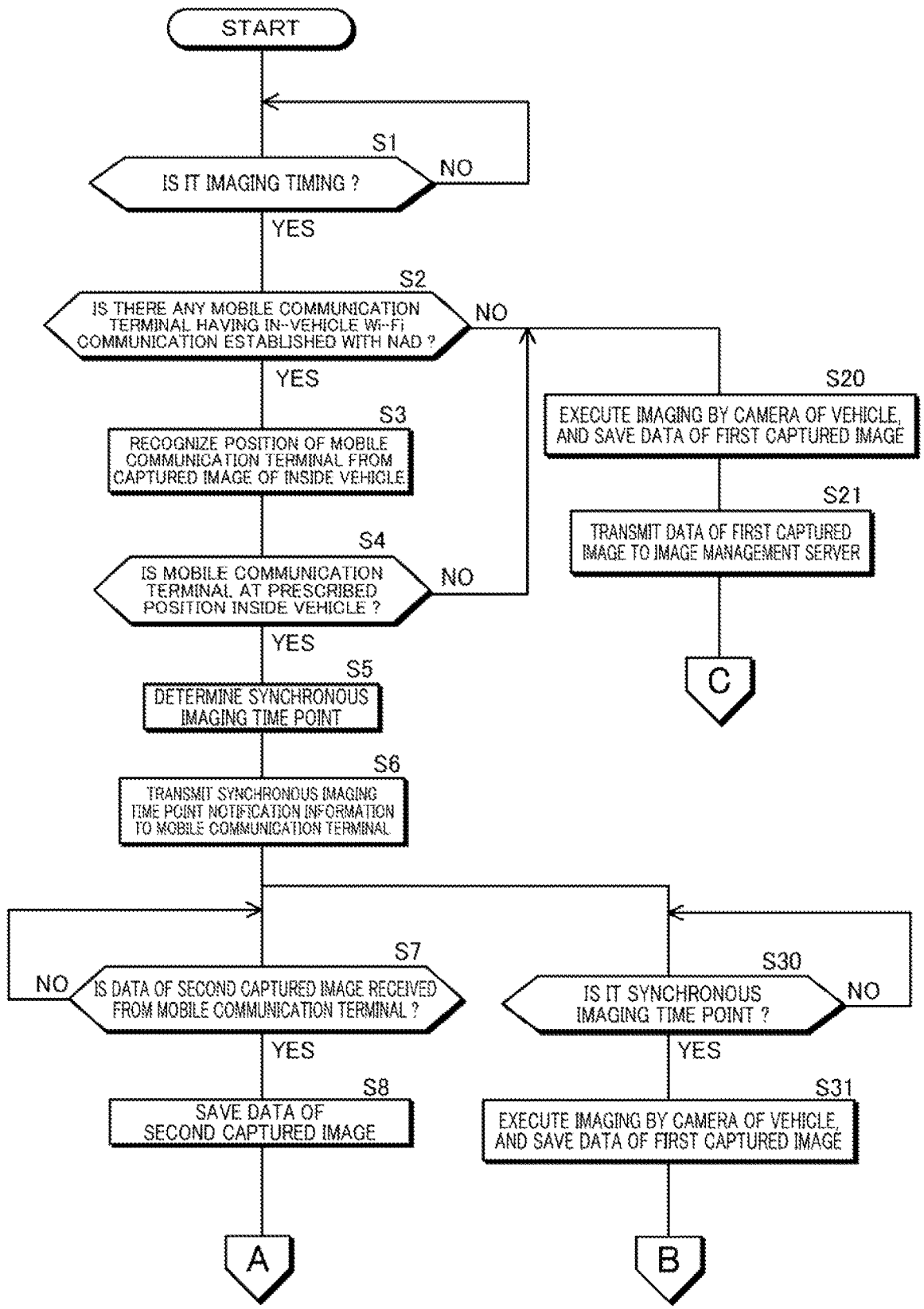
FIG. 3 is a first flowchart of captured image providing processing.

When determined in Step S1 of FIG. 3 that it is one of the imaging timings (1) to (3), the imaging control unit 11 proceeds the processing to Step S2. In Step S2, the imaging control unit 11 determines whether there is any mobile communication terminal having in-vehicle Wi-Fi communication established with the NAD 30. Then, the imaging control unit 11 proceeds the processing to Step S3 when there is a mobile communication terminal having the established in-vehicle Wi-Fi communication, and proceeds the processing to Step S20 when there is no mobile communication terminal having the established in-vehicle Wi-Fi communication.

In Step S20, the imaging control unit 11 captures an image by at least one of the front camera 32, the rear camera 33, and the in-vehicle camera 34, and saves the data of the acquired first captured image in the captured image area 22 of the memory 20. In a following Step S21, the communication control unit 12 transmits the data of the first captured image to the image management server 510 by the NAD 30, and proceeds the processing to Step S11 of FIG. 4. In this case, only the data of the first captured image that is captured by the dashboard camera recorder 1 is transmitted to the image management server 510.

Furthermore, in Step S3, the mobile communication terminal position recognition unit 17 extracts the image part of the mobile communication terminal from the captured image of the in-vehicle camera 34 to recognize the position of the mobile communication terminal inside the vehicle 100. In the case of FIG. 1, the positions of the mobile communication terminals 51 and 52 used inside the vehicle 100 are recognized. In a next Step S4, the mobile communication terminal position recognition unit 17 determines whether or not the positions of the mobile communication terminals correspond to the prescribed position described above.

In the case of FIG. 1, it is determined that the mobile communication terminal 52 is located at the prescribed position. Then, the mobile communication terminal position recognition unit 17 proceeds the processing to Step S5 when the position of the mobile communication terminal is the prescribed position, and proceeds the processing to Step S20 when the position of the mobile communication terminal is not the prescribed position. In Step S5, the synchronous imaging time point determination unit 15 determines the synchronous imaging time point for synchronizing imaging performed by the dashboard camera recorder 1 with imaging performed by the mobile communication terminal according to the imaging timing recognized in Step S1. In a following Step S6, the communication control unit 12 transmits, to the mobile communication terminal 52, synchronous imaging time point notification information for notifying the synchronous imaging time point via the in-vehicle Wi-Fi communication by the NAD 30.

Upon receiving the synchronous imaging time point notification information transmitted from the dashboard camera recorder 1, the mobile communication terminal 52 recognizes the synchronous imaging time point from the synchronous imaging time point notification information, and captures an image by the camera 52a when it comes to the synchronous imaging time point. Then, the mobile communication terminal 52 transmits the data of the acquired second captured image to the dashboard camera recorder 1 via the in-vehicle Wi-Fi communication by the NAD 30. Note that images captured by the dashboard camera recorder 1 and the mobile communication terminal 52 may be moving images or sequential images captured in a period including before and after the synchronous imaging time point.

Returning to the flowchart of FIG. 3, the communication control unit 12 and the imaging control unit 11 execute the processing of Steps S7, S8 and the processing of Steps S30, S31 in parallel. Upon receiving the data of the second captured image from the mobile communication terminal 52 in Step S7, the communication control unit 12 proceeds the processing to Step S8 to save the data of the second captured image in the captured image area 22 of the memory 20, and proceeds the processing to Step S9 of FIG. 4.

Furthermore, when determined in Step S30 that it is the synchronous imaging time point, the imaging control unit 11 proceeds the processing to Step S31 to capture the image by at least one of the front camera 32, the rear camera 33, and the in-vehicle camera 34. Then, the imaging control unit 11 saves the data of the acquired first captured image in the captured image area 22 of the memory 20, and proceeds the processing to Step S9 of FIG. 4.

In Step S9, the image processing unit 14 generates integrated image data in which the data of the first captured image and the data of the second captured image saved in the captured image area 22 by the imaging control unit 11 are associated and recorded. In a following Step S10, the communication control unit 12 transmits the integrated image data generated by the image processing unit 14 to the image management server 510 via the wide area network 500 by the communication control unit 12 and the NAD 30.

The integrated image data contains the data of the first captured image that is captured by the front camera 32, the rear camera 33, or the in-vehicle camera 34 of the dashboard camera recorder 1 and the data of the second captured image that is captured by the camera 52a of the mobile communication terminal 52 at the same timing (at the synchronous imaging time point, period including before and after the synchronous imaging time point).

Therefore, from the integrated image data, the image management server 510 can acquire the captured images in the surroundings of the vehicle 100 or inside the vehicle 100 from various angles captured at the same timing. Furthermore, the image management server 510 can acquire more detailed information regarding an accident and the like occurring in the vehicle 100 by analyzing the data of the first captured image and the data of the second captured image.

4. Other Embodiments

While the four-wheeled vehicle 100 is described in the embodiment above as the mobile body to which the dashboard camera recorder 1 is mounted, the mobile body to which the dashboard camera recorder 1 is mounted may also be a two-wheeled vehicle, a flying object, a boat, or the like.

While the cellular or Wi-Fi communication is used for accessing the wide area network 500 in the embodiment described above, it is also possible to use other communication schemes. Furthermore, while the in-vehicle Wi-Fi (corresponds to a second communication network of the present discloser) is used to establish communication between the mobile communication terminals 51, 52 used by the users U1, U2 of the vehicle 100 and the dashboard camera recorder 1, it is also possible to use other communication specifications such as Bluetooth (registered trademark).

While the case of configuring the communication system of the present disclosure with the dashboard camera recorder 1 is described in the embodiment above, the communication system of the present disclosure may also be configured with a communication terminal having a camera (a smartphone, a mobile phone, a tablet terminal, a camera with communication function, or the like).

In the embodiment described above, by the flowchart of FIG. 3, the communication control unit 12 transmits the synchronous imaging time point notification information only to the mobile communication terminal located at the prescribed position of the vehicle 100 (the mobile communication terminal 52 in the case of FIG. 1) to acquire the data of the second captured image that is captured by the mobile communication terminal. As another configuration, the synchronous imaging time point notification information may be transmitted targeted to the mobile communication terminals (the mobile communication terminals 51 and 52 in the case of FIG. 1) used in the vehicle 100 without making determination whether those are located at the prescribed position so as to acquire the data of the second captured images that are captured by the mobile communication terminals.

Furthermore, the mobile communication terminal position recognition unit 17 may set the prescribed position for recognizing the position of the mobile communication terminal in accordance with the number of mobile communication terminals having the in-vehicle Wi-Fi communication established with the dashboard camera recorder 1. For example, the prescribed position is set at a position capable of imaging the rear side of the vehicle 1 when there is a single mobile communication terminal having the established first communication for the relay communication, the prescribed positions may be set at a position capable of imaging the right rear side of the vehicle 1 and at a position capable of imaging the left rear side of the vehicle 1 when there are two mobile communication terminals, and the prescribed positions may be set at a position capable of imaging the right rear side of the vehicle 1, at a position capable of imaging the rear center, and at a position capable of imaging the left rear side of the vehicle 1 when there are three mobile communication terminals, so that the imaging range in the surroundings of the vehicle 1 can be expanded.

Furthermore, upon recognizing that the mobile communication terminals are located at the prescribed positions of the vehicle 1, the mobile communication terminal position recognition unit 17 recognizes the posture of the mobile communication terminals, and the communication control unit 12 may receive the data of the second captured images via the in-vehicle Wi-Fi communication when it is recognized by the mobile communication terminal position recognition unit 17 that the mobile communication terminals are located at the prescribed positions in a prescribed posture.

In the embodiment described above, a mobile communication terminal performance recognition unit that recognizes the performance of the mobile communication terminals may be provided, and the communication control unit 12 may receive the data of the second captured images from the mobile communication terminals via the in-vehicle Wi-Fi communication when the performance of the mobile communication terminals having the in-vehicle Wi-Fi communication established with the NAD 30 is determined to be a prescribed performance.

In the embodiment described above, the synchronous imaging time point determination unit 15 is provided to capture images by the dashboard camera recorder 1 and by the mobile communication terminals 51, 52 synchronously. However, the synchronous imaging time point determination unit 15 may be omitted, and the data of the second captured images that are captured by the mobile communication terminals 51 and 52 at arbitrary timings may be acquired.

Alternatively, the synchronous imaging time point notification information may be notified not by limiting to the mobile communication terminal used in the vehicle 100 but also to the mobile communication terminals having the in-vehicle Wi-Fi communication established with the NAD 30 (the mobile communication terminals 51 to 55 in the case of FIG. 1) to acquire the data of the second captured images that are captured by each of the mobile communication terminals.

In the embodiment above, described is the configuration in which the dashboard camera recorder 1 communicates with the mobile communication terminals 51 to 55 via wireless communication. However, as illustrated in FIG. 1, when the mobile communication terminals 51 and 52 are used inside the vehicle 100, the mobile communication terminals 51 and 52 may also be connected to the dashboard camera recorder 1 via a communication cable to perform wired communication.

In the embodiment described above, as the prescribed image processing based on the first captured image data and the second captured image data, the image processing unit 14 executes the processing of generating the integrated image data containing the data of the first captured image and the data of the second captured image in an associated manner. As another image processing based on the first captured image data and the second captured image data, for example, processing such as recognizing an object existing in the surroundings of the vehicle 100, determining the risk of having contact with the object, and the like may be executed.

Figure 2:
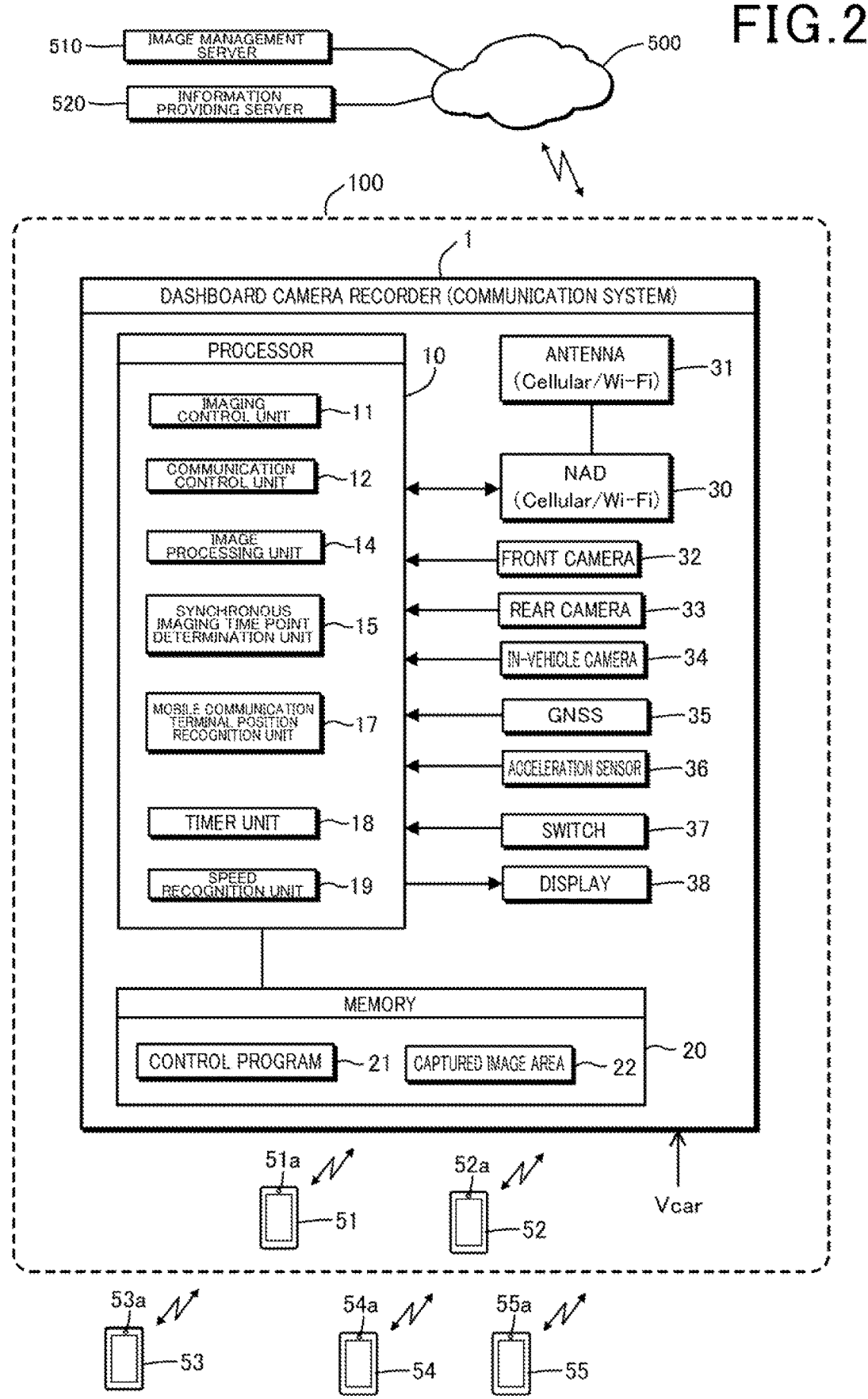
FIG. 2 is a block diagram of the dashboard camera recorder.

Note that FIG. 2 is a schematic diagram illustrating the configuration of the dashboard camera recorder 1 by sectioning it in accordance with the main processing contents in order to facilitate understanding of the present invention, and the configuration of the dashboard camera recorder 1 may also be formed by other sectioned blocks. Furthermore, the processing of each structural element may be executed by a single hardware unit or may be executed by a plurality of hardware units. Moreover, the processing of each structural element according to the flowcharts illustrated in FIG. 3 and FIG. 4 may be executed by a single program or may be executed by a plurality of programs.

4. Configurations Supported by the Embodiments

The above-described embodiments support the following items.

(Item 1) A communication system including:
a first imaging device; a communication unit configured to execute a first communication with a mobile communication terminal and a second communication with a communication device other than the mobile communication terminal to execute relay communication relaying the communication between the mobile communication terminal and the communication device; a communication control unit configured to receive, from the mobile communication terminal via the first communication, data of a second captured image that is captured by a second imaging device provided in the mobile communication terminal having the first communication established for the relay communication; and an image processing unit configured to execute prescribed image processing based on the data of a first captured image that is captured by the first imaging device and the data of the second captured image.

According to the communication system of item 1, it is possible to acquire the data of the second captured image that is captured by the second imaging device of the mobile communication terminal in various angles along with the data of the first captured image that is captured by the first imaging device of the communication system with a simple configuration with low cost.

(Item 2) The communication system according to item 1, including a synchronous imaging time point determination unit configured to determine a synchronous imaging time point for synchronizing imaging performed by the first imaging device and the second imaging device, in which the communication control unit: transmits, via the first communication, synchronous imaging time point information indicating the synchronous imaging time point to the mobile communication terminal having the first communication established for the relay communication; and receives, via the first communication, the data of the second captured image that is captured by the second imaging device at the synchronous imaging time point according to the synchronous imaging time point information, and the image processing unit executes the prescribed image processing based on the data of the first captured image that is captured by the first imaging device at the synchronous imaging time point and the data of the second captured image that is captured by the second imaging device at the synchronous imaging time point.

According to the communication system of item 2, recognizing an object, determining the risk of having contact with the object, and the like can be done by the image processing performed by using the data of the first captured image that is captured by the first imaging device of the communication system and the data of the second captured image that is captured by the second imaging device of the mobile communication terminal at the same time point.

(Item 3) The communication system according to item 1 or 2, in which, as the prescribed image processing, the image processing unit executes processing of generating integrated image data containing the data of the first captured image and the data of the second captured image in an associated manner.

According to the communication system of item 3, it is possible to acquire the integrated image data containing, in an associated manner, the data of the first captured image that is captured by the first imaging device of the communication system and the data of the second captured image that is captured by the second imaging device of the mobile communication terminal at the same time point.

(Item 4) The communication system according to item 3, in which the communication control unit transmits the integrated image data to the communication device via the second communication.

According to the communication system of item 4, it is possible to provide the integrated image data containing the data of the second captured image that is captured by the second imaging device of the mobile communication terminal to the communication device.

(Item 5) The communication system according to any one of items 1 to 4, the communication system being used in a mobile body and including a mobile communication terminal position recognition unit configured to recognize whether or not the mobile communication terminal is located at a prescribed position of the mobile body, in which the communication control unit receives the data of the second captured image via the first communication, when the mobile communication terminal position recognition unit recognizes that the mobile communication terminal is located at the prescribed position.

According to the communication system of item 5, it is possible to capture and acquire the image inside the mobile body or in the vicinity of the mobile body by the second imaging device of the mobile communication terminal used inside the mobile body or in the vicinity of the mobile body.

(Item 6) The communication system according to item 5, in which the mobile communication terminal position recognition unit sets the prescribed position in accordance with the number of the mobile communication terminals having the first communication established for the relay communication.

According to the communication system of item 6, it is possible to set the prescribed position in accordance with the imaging range covered by the second imaging device of the mobile communication terminal, depending on the number of the mobile communication terminals having the first communication established for the relay communication.

(Item 7) The communication system according to item 5 or 6, in which the mobile communication terminal position recognition unit recognizes a posture of the mobile communication terminal upon recognizing that the mobile communication terminal is located at the prescribed position of the mobile body, and the communication control unit receives the data of the second captured image via the first communication, when the mobile communication terminal position recognition unit recognizes that the mobile communication terminal is located at the prescribed position in a prescribed posture.

According to the communication system of item 7, by recognizing the posture of the mobile communication terminal, it is possible to acquire the data of the second captured image that is captured by the second imaging device by designating the imaging range and the imaging direction of the second imaging device of the mobile communication terminal in a more detailed manner.

(Item 8) The communication system according to any one of items 1 to 7, including a mobile communication terminal performance recognition unit configured to recognize a performance of the mobile communication terminal, in which the communication control unit receives the data of the second captured image from the mobile communication terminal via the first communication, when the mobile communication terminal performance recognition unit recognizes that the performance of the mobile communication terminal having the first communication established for the relay communication is a prescribed performance.

According to the communication system of item 8, it is possible to receive the data of the second captured image that is captured by the second imaging device from the mobile communication terminal, only in a case where the communication performance of the mobile communication terminal, the performance of the second imaging device provided in the mobile communication terminal, and the like are equal to or more than a prescribed level.

(Item 9) The communication system according to any one of items 1 to 8, in which the communication unit executes the relay communication for a plurality of the mobile communication terminals via the first communication established with the plurality of mobile communication terminals, and the communication control unit receives the data of the second captured images that are captured by the second imaging devices provided in the plurality of mobile communication terminals having the first communication established for the relay communication.

According to the communication system of item 9, it is possible to collect the data of the captured images in a wide range by receiving the data of the second captured images that are captured by the second imaging devices of the plurality of mobile communication terminals.

(Item 10) The communication system according to any one of items 1 to 9, the communication system being configured with a camera or a dashboard camera recorder.

According to the communication system of item 10, it is possible to achieve the communication system according to items 1 to 9 as functions of the camera or the dashboard camera recorder.

REFERENCE SIGNS LIST

1 Dashboard camera recorder
10 Processor
11 Imaging control unit

12 Communication control unit
14 Image processing unit
15 Synchronous imaging time point determination unit
17 Mobile communication terminal position recognition unit
18 Timer unit
19 Speed recognition unit
20 Memory
21 Control program
22 Captured image area
30 NAD
31 Antenna
32 Front camera
33 Rear camera
34 In-vehicle camera
35 GNSS
36 Acceleration sensor
37 Switch
38 Display
51 to 55 Mobile communication terminal
51a to 55a Camera
100 Vehicle (mobile body)
110 Another vehicle
300 Cellular communication base station
310 Wi-Fi spot router
500 Wide area network
510 Image management server
520 Information providing server
U1 to U5 User

What is claimed is:

1. A communication system comprising:
a first camera mounted on a vehicle and capturing images of surroundings of the vehicle; and
a processor, wherein the processor comprises:
a communication unit configured to execute a first communication with a plurality of mobile communication terminals and a second communication with a communication device other than the plurality of mobile communication terminals to execute relay communication relaying a communication between the plurality of mobile communication terminals and the communication device through an antenna;
a communication control unit configured to receive, from each of the plurality of mobile communication terminals via the first communication, data of a second captured image that is captured by a second camera provided in each of the plurality of mobile communication terminals having the first communication established for the relay communication, wherein at least one of the plurality of mobile communication terminals is used by at least one user of the vehicle, and at least one of the plurality of mobile communication terminals is present outside the vehicle in a vicinity of the vehicle; and
an image processing unit configured to generate integrated image data in which data of a first captured image that is captured by the first camera and the data of the second captured image captured at a same timing are integrated.

2. The communication system according to claim 1, wherein the processor comprises a synchronous imaging time point determination unit configured to determine a synchronous imaging time point for capturing images by synchronizing imaging timing by the first camera and the second camera, wherein
the communication control unit:
transmits, via the first communication, synchronous imaging time point information indicating the synchronous imaging time point to at least one of the plurality of mobile communication terminals having the first communication established for the relay communication; and
receives, via the first communication, the data of the second captured image that is captured by the second camera at the synchronous imaging time point according to the synchronous imaging time point information, and
the image processing unit generates the integrated image data based on the data of the first captured image that is captured by the first camera at the synchronous imaging time point and the data of the second captured image that is captured by the second camera at the synchronous imaging time point.

3. The communication system according to claim 1, wherein the communication control unit transmits the integrated image data to the communication device via the second communication.

4. The communication system according to claim 1, wherein the processor comprises a mobile communication terminal position recognition unit configured to recognize whether or not at least one of the plurality of mobile communication terminals is located at a prescribed position of the vehicle, wherein
the communication control unit receives the data of the second captured image via the first communication, when the mobile communication terminal position recognition unit recognizes that at least one of the plurality of mobile communication terminals is located at the prescribed position.

5. The communication system according to claim 4, wherein the mobile communication terminal position recognition unit sets the prescribed position in accordance with a number of the plurality of mobile communication terminals having the first communication established for the relay communication.

6. The communication system according to claim 4, wherein
the mobile communication terminal position recognition unit recognizes a posture of at least one of the plurality of mobile communication terminals upon recognizing that at least one of the plurality of mobile communication terminals is located at the prescribed position of the vehicle, and
the communication control unit receives the data of the second captured image via the first communication, when the mobile communication terminal position recognition unit recognizes that at least one of the plurality of mobile communication terminals is located at the prescribed position in a prescribed posture.

7. The communication system according to claim 1, wherein the processor comprises a mobile communication terminal performance recognition unit configured to recognize a performance of at least one of the plurality of mobile communication terminals, wherein
the communication control unit receives the data of the second captured image from at least one of the plurality of mobile communication terminals via the first communication, when the mobile communication terminal performance recognition unit recognizes that the performance of at least one of the plurality of mobile communication terminals having the first communication established for the relay communication is a prescribed performance.

8. The communication system according to claim 1, the communication system being configured with a dashboard camera recorder.

\* \* \* \* \*